US010227949B2

(12) United States Patent
Graham et al.

(10) Patent No.: US 10,227,949 B2
(45) Date of Patent: Mar. 12, 2019

(54) PISTON FOR AN INTERNAL COMBUSTION ENGINE AND METHOD FOR PRODUCING SAID PISTON

(71) Applicant: Caterpillar Inc., Peoria, IL (US)

(72) Inventors: Curtis J. Graham, Peoria, IL (US); Daniel T. Cavanaugh, Chillicothe, IL (US); Waylon S. Walker, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 48 days.

(21) Appl. No.: 15/389,521

(22) Filed: Dec. 23, 2016

(65) Prior Publication Data

US 2018/0179986 A1    Jun. 28, 2018

(51) Int. Cl.
| | | |
|---|---|---|
| F02F 3/28 | (2006.01) | |
| F02B 77/08 | (2006.01) | |
| F02B 23/06 | (2006.01) | |
| F02F 3/22 | (2006.01) | |

(52) U.S. Cl.
CPC ............ F02F 3/28 (2013.01); F02B 23/0672 (2013.01); F02B 77/08 (2013.01); F02B 2275/00 (2013.01); F02F 3/22 (2013.01); F02F 2200/00 (2013.01); F02F 2200/04 (2013.01)

(58) Field of Classification Search
CPC ........ F02F 3/28; F02F 3/20; F02F 3/26; F02F 2200/04; F02B 77/08

USPC ...................... 123/193.6; 29/888.04–888.049
See application file for complete search history.

(56) References Cited

U.S. PATENT DOCUMENTS

| | | | |
|---|---|---|---|
| 3,358,349 A * | 12/1967 | Rosen .................... | B23K 20/08 228/107 |
| 4,614,150 A | 9/1986 | Deutschmann | |
| 5,809,962 A | 9/1998 | Abbott et al. | |
| 9,416,750 B2 | 8/2016 | Bischofberger | |
| 2013/0025561 A1 | 1/2013 | Gabriel et al. | |
| 2014/0230646 A1* | 8/2014 | Schneider .................. | F16J 1/08 92/172 |
| 2016/0123274 A1* | 5/2016 | Miller ...................... | F02F 3/28 123/41.35 |
| 2016/0208735 A1* | 7/2016 | Schneider ................. | F02F 3/22 |

FOREIGN PATENT DOCUMENTS

EP            0520536            12/1992

* cited by examiner

*Primary Examiner* — Syed O Hasan
(74) *Attorney, Agent, or Firm* — Bookoff McAndrews

(57) ABSTRACT

A piston including a piston crown, the piston crown defining a combustion bowl with a bowl base and bottom surface. A failure initiation structure is provided on the bottom surface of the combustion bowl to initiate favorable fracture at predetermined loads. Such favorable fracture may lead to the a separation of a fragment of the bowl base from the combustion bowl when a predetermined load or pressure is exceeded within the combustion bowl.

19 Claims, 7 Drawing Sheets

PISTON FOR AN INTERNAL COMBUSTION ENGINE AND METHOD FOR PRODUCING SAID PISTON

TECHNICAL FIELD

The present disclosure relates generally to internal combustion engines, and more particularly to pistons operating within cylinder bores of such internal combustion engines.

BACKGROUND

Internal combustion engines, including diesel engines, gasoline engines, natural gas engines, and other engines known in the art, operate by converting heat energy of fuels to kinetic energy. In an internal combustion engine, burning of a fuel occurs in a space called a combustion chamber. This burning of fuel creates gases of high temperature and pressure, which expand to cause movement, for example by acting on one or more pistons interconnected by connecting rods to a crankshaft, and are typically disposed to reciprocate within cylindrical bores (cylinders) formed in a crankcase. The expansion of the gases produced during combustion applies force to the piston. An open end of the cylinder permits reciprocating movement of the piston within the cylinder. A crankshaft connected to the piston converts the linear motion of the piston (resulting from the combustion of fuel in the combustion chamber) into rotational motion.

The combustion chamber of an engine may comprise a cylinder bore, a cylinder liner, a piston disposed within a cylinder bore, a fuel injector surrounded by an injector sleeve that is disposed in a cylinder head that may have one or more coolant passages through which water or a coolant may flow. In general, a piston is formed to have a generally cupped shape, with the piston head forming the base of the combustion bowl, and the skirt portion being connected to the base and surrounding an enclosed gallery of the piston. A piston skirt typically includes a pin opening and other support structures for connection to the connecting rod. The piston crown, together with the walls of a cylinder or a cylinder liner, in which the piston reciprocally moves, and the cylinder head, delimit a combustion chamber.

Many piston designs are known in the art. For example, U.S. Pat. No. 9,416,750 B2 (Bischofberger), discloses a piston for an internal combustion engine that has an piston head that has an insert made of an annular component and that is held in the piston head by means of an undercut section. The annular component has an inner wall on the piston bowl side, and the inner wall continuously tapers off all the way to the bowl wall or the bowl base in a flush manner to form a circumferential edge that tapers into a point. While the piston disclosed in the '750 patent may increase the piston's tolerance of stress and may reduce the risk of crack formation in the piston head, the need for piston designs that are designed to deal robustly with over-pressures arising from the presence of incompressible liquid in the combustion chamber is apparent. The present disclosure is directed, at least in part, to improving or overcoming one or more aspects of prior systems.

SUMMARY OF THE INVENTION

In one aspect, a piston assembly for an internal combustion engine is presented. The piston assembly comprises a piston head, having a piston head rim adapted to engage with a cylinder head. The piston head also comprises a combustion bowl having a bowl base, the bowl base having a combustion surface facing the cylinder head and a bottom surface facing a connecting rod. The piston assembly also comprises a failure initiation structure in the bottom surface of the bowl base configured so that a favorable fracture occurs along the failure initiation structure that separates a fragment of the bowl base from the combustion bowl when a predetermined load or pressure in the combustion bowl is exceeded.

In another aspect, an internal combustion engine is disclosed. The internal combustion engine comprises a cylindrical bore, and a piston assembly configured to be disposed within the cylinder. The piston assembly comprises assembly comprises a piston head, having a piston head rim adapted to engage with a cylinder head. The piston head also comprises a combustion bowl having a bowl base, the bowl base having a combustion surface facing the cylinder head and a bottom surface facing a connecting rod. The disclosed internal combustion engine also comprises a failure initiation structure in the bottom surface of the bowl base configured so that a favorable fracture occurs along the failure initiation structure that separates a fragment of the bowl base from the combustion bowl when a predetermined load or pressure in the combustion bowl is exceeded.

In yet another aspect of the present disclosure, a method for producing a piston for an internal combustion engine is disclosed. The method of producing a piston includes the steps of providing a piston head heaving a piston head rim adapted to engage with a cylinder head, then providing a combustion bowl within the piston head having a bowl base, the bowl base having a bottom surface. The method further includes providing a failure initiation structure in the bottom surface of the bowl base so that a favorable fracture along the failure initiation structure separates a fragment of the bowl base from the combustion bowl when a predetermined load or pressure in the combustion bowl is exceeded.

DETAILED DESCRIPTION

Figure 1:
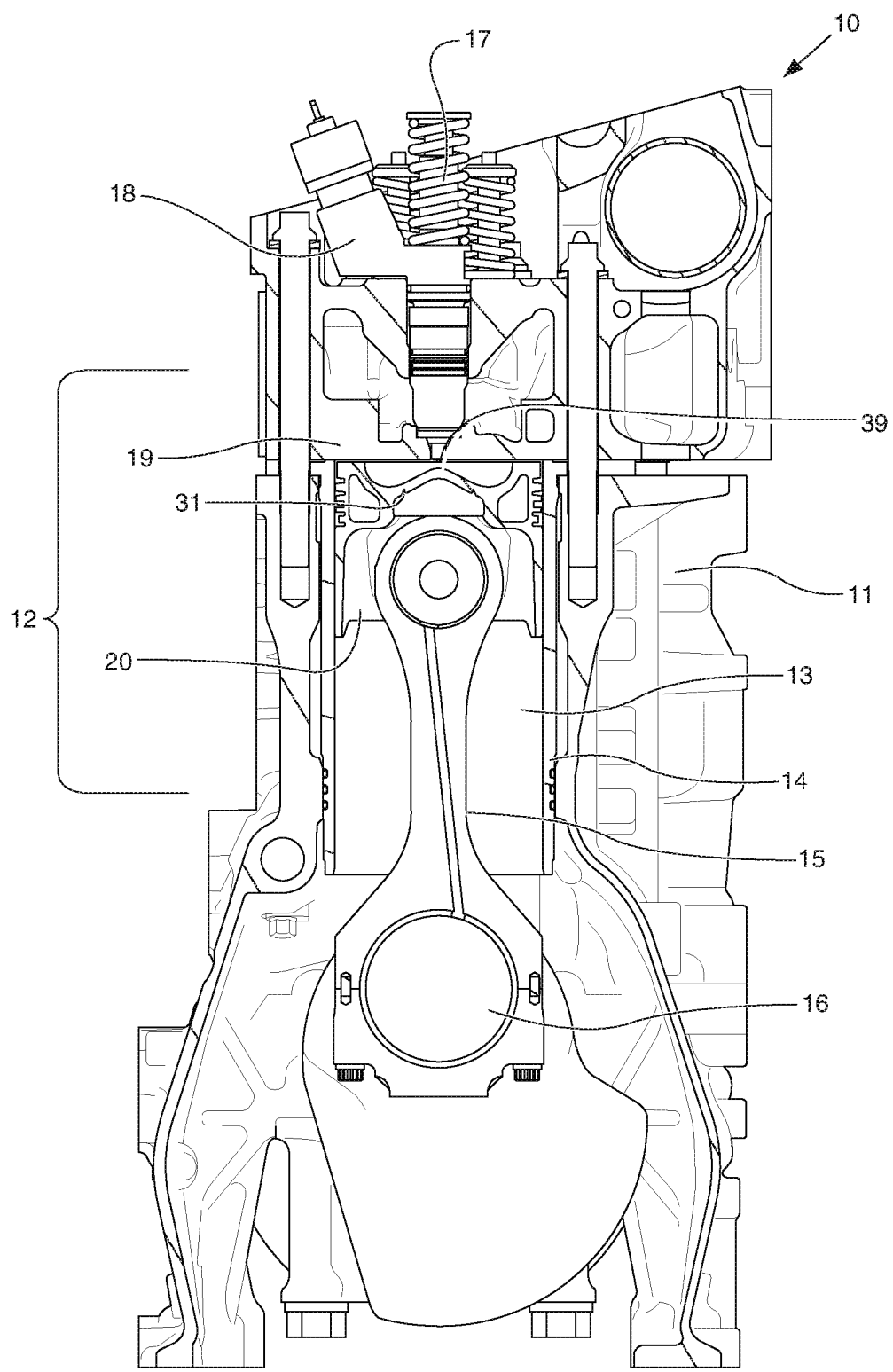
FIG. 1 is a cross-sectional view of a cylinder assembly of an internal combustion engine according to one embodiment.

The following discussion refers to the drawing which represent some possible approaches. However, the drawings are not necessarily to scale and certain features may be exaggerated, removed, or partially sectioned to better illustrate and explain the present disclosure. An exemplary internal combustion engine 10 is illustrated in FIG. 1. Internal combustion engine 10 is depicted and described as a diesel engine. However, it is contemplated that internal combustion engine 10 may be any other type of internal combustion engine, such as, for example, a gasoline or natural gas engine. Internal combustion engine 10 may include an engine block 11, a plurality of cylinder assemblies (only one shown), a cylinder head 19, a piston assembly 20 slidably disposed within a cylinder bore 13, a valve system (only partially depicted) 17, a fuel injector 18, and a connecting rod 15 connecting the piston assembly 20 to a crankshaft 16. It is contemplated that the internal combustion engine 10 may include any number of cylinder assemblies and that the cylinder assemblies may be disposed in an "in-line" configuration, a "V" configuration, or any other conventional configuration known to those of ordinary skill in the art.

As illustrated in FIG. 1, engine 10 is made up of an engine block 11 defining a cylinder assembly 12. A piston assembly 20 is positioned in the cylinder in a slidable manner. The cylinder may be formed by a cylinder liner (not labeled) positioned in the engine block 11 wherein the cylinder liner defines the cylinder. A cylinder head 19 connects to the engine block 11. The portion of the cylinder head 19 facing the cylinder bore 13, the combustion surface of the piston head 24, and the cylinder bore 13, define a combustion chamber. As would be readily understood by one of ordinary skill in the art, the volume of the combustion chamber will vary as the piston head 25 travels slidably through the cylinder bore 13 from top dead center position to bottom dead center position (not depicted). A fuel injector 18 may be disposed in the cylinder head 19. The fuel injector 18 has a tip portion 39 with a plurality of nozzles (not shown) adapted to direct fuel into the combustion chamber 24. Additionally, a valve system 17 may be disposed within the cylinder head 19.

Figure 2A:
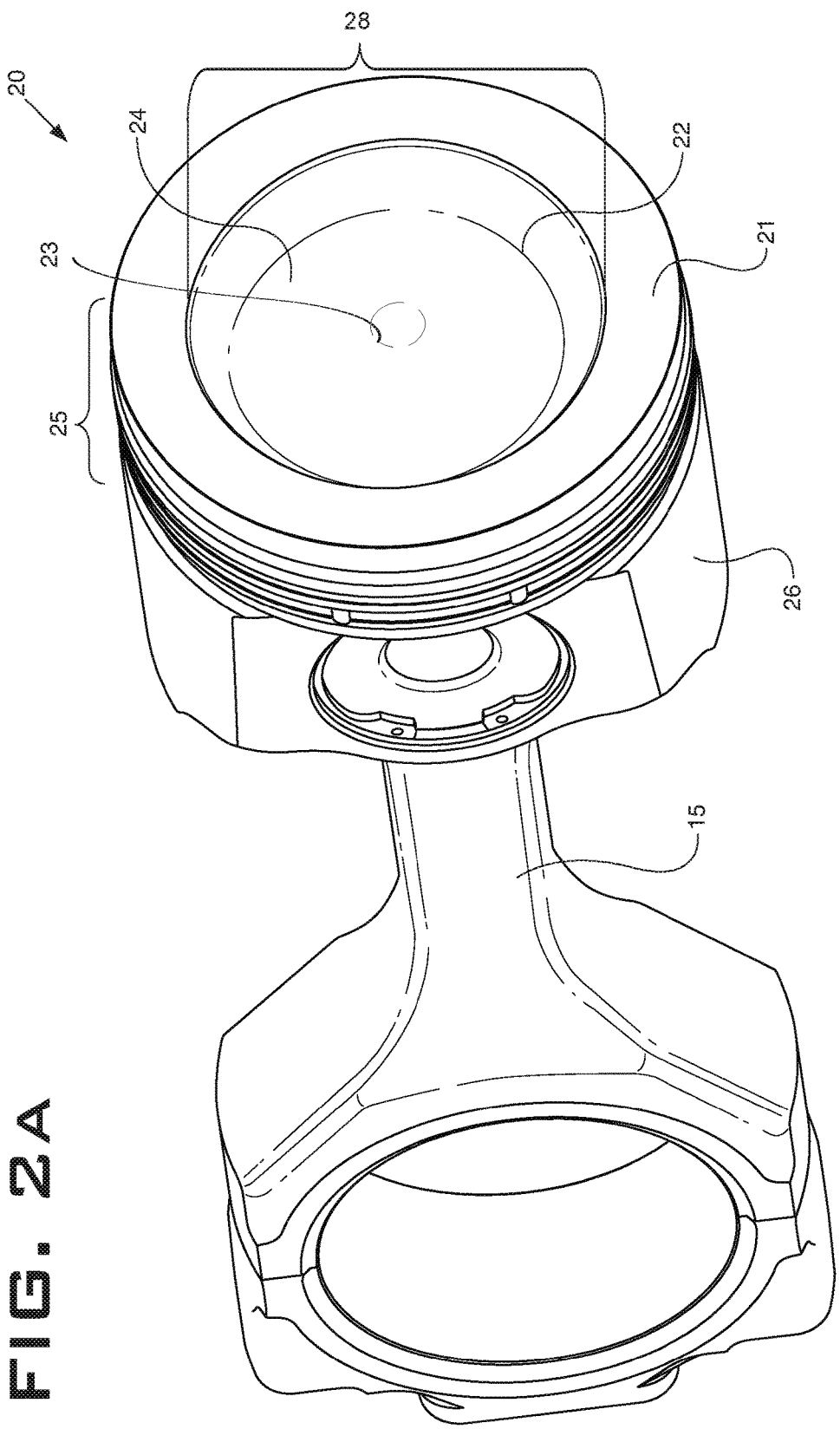
FIG. 2A is a perspective view of a piston assembly of the internal combustion engine of FIG. 1.
Figure 2B:
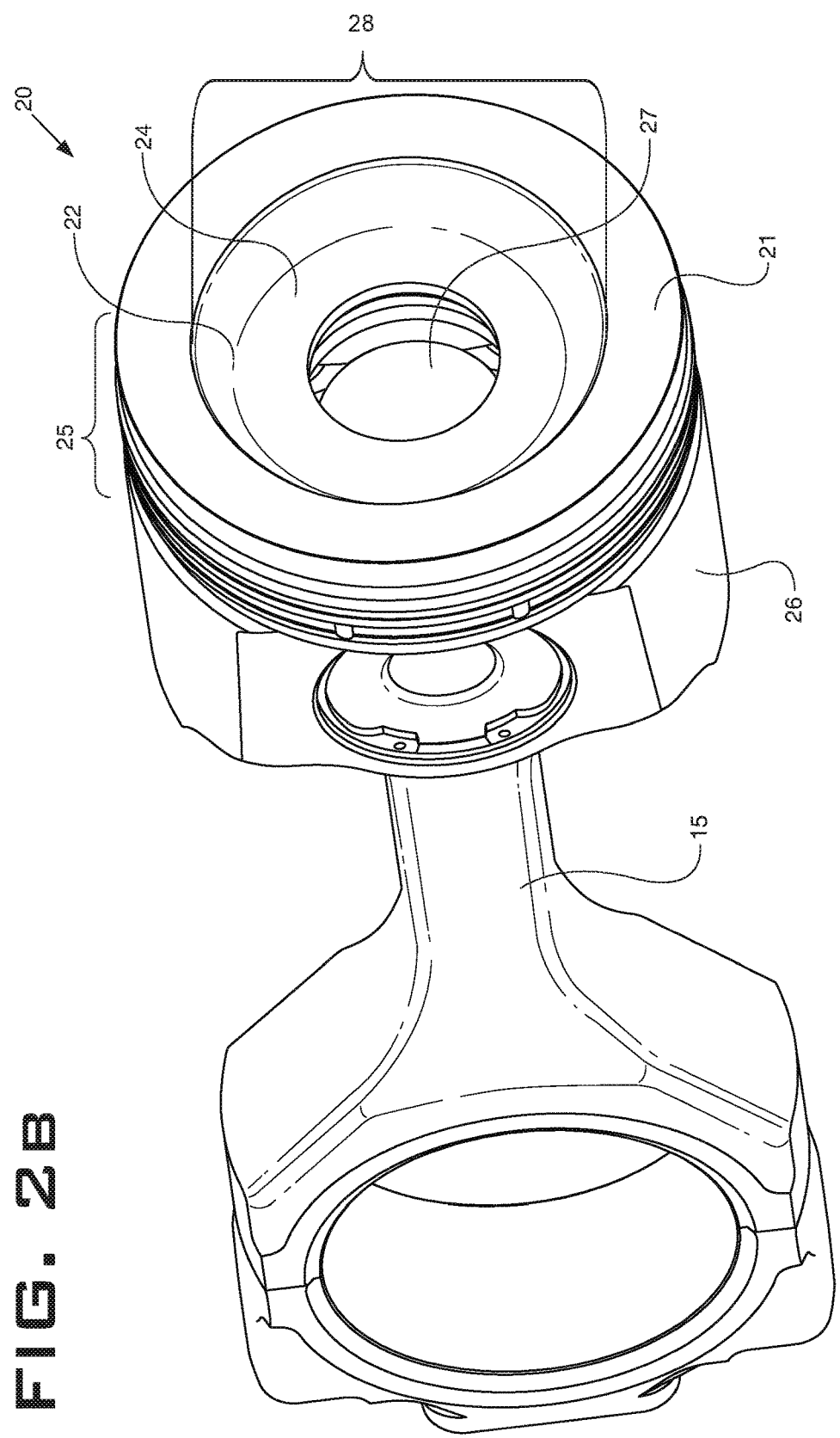
FIG. 2B is another perspective view of a piston assembly of the internal combustion engine of FIG. 1.
Figure 3A:
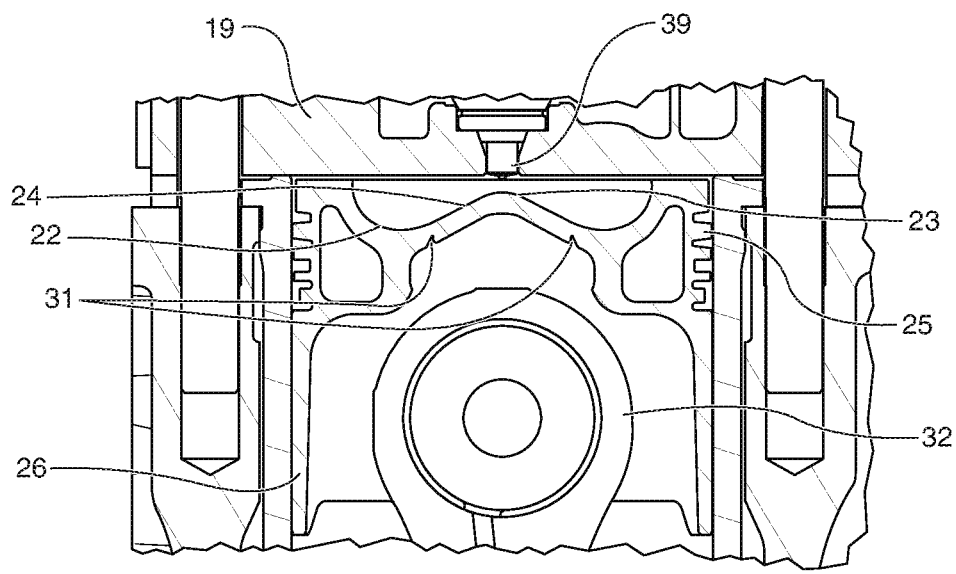
FIG. 3A is a cross-sectional view of one embodiment of a piston within the internal combustion engine of FIG. 1.
Figure 3B:
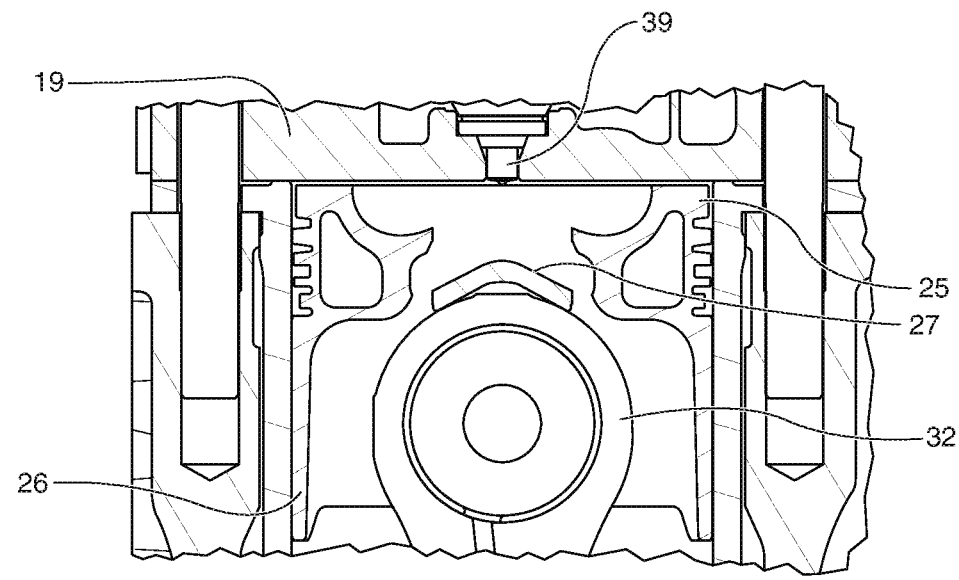
FIG. 3B is a cross-sectional view of an embodiment of the piston in FIG. 3A operating under a predetermined load within the internal combustion engine of FIG. 1.

As depicted in FIGS. 2A and 2B, the piston assembly 20 may include a piston head 25 which has a piston head rim 21 which engages with the cylinder head 19 (as shown in FIGS. 3A and 3B). The piston head 25 has a combustion bowl 28 formed in the piston head 25. The combustion bowl 28 is surrounded by the piston head rim 21. The combustion bowl 28 has a bowl base 22 which defines the deepest portion of the combustion bowl 28. The bowl base 22 has a combustion surface 24 that faces the cylinder head and a bottom surface 42 that faces the connecting rod.

The combustion bowl 28 may have an elevation portion 23 in the center of the combustion bowl 28. However, while the Figures in this disclosure depict the combustion bowl 28 as having an elevated portion 23, one of ordinary skill in the art would understand that this is not required. Combustion bowl 28s may have flat, or otherwise curved contours at the center of the bowl.

Figure 4:
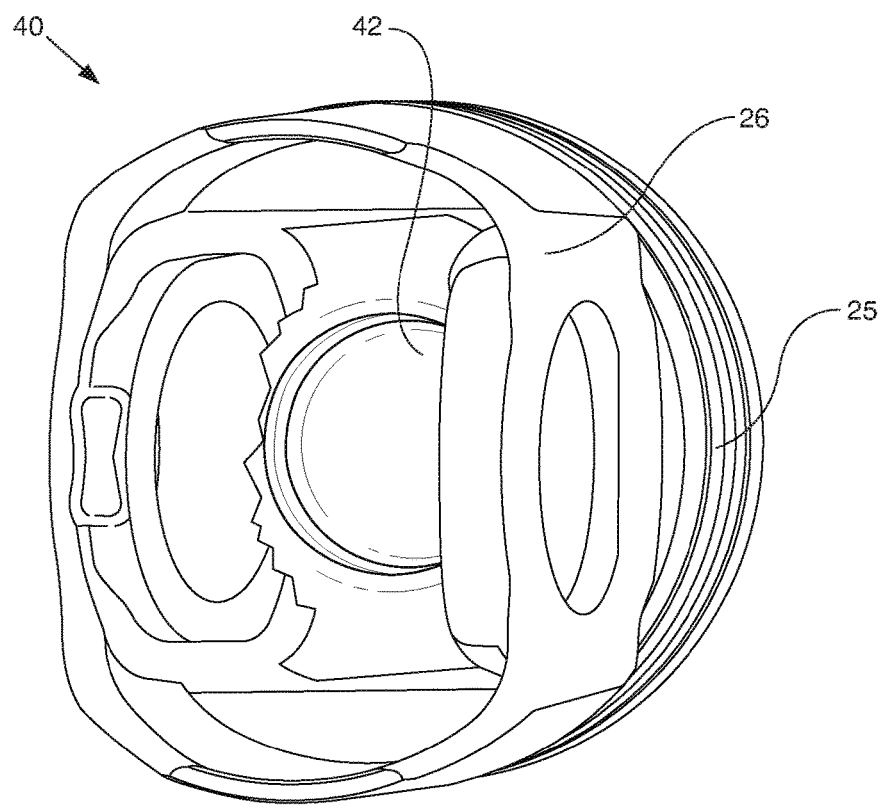
FIG. 4 is a diagrammatic view of the underside of a piston according to one embodiment.

The piston assembly 20 also includes a piston skirt 26 that may be in one piece with the piston head 25 or may be in a separate piece from the piston head 25. As depicted in FIG. 4, the piston skirt 26 may surround cooling galleries housed in the underside of the combustion bowl 28. Additionally, the piston skirt 26 may accommodate the components necessary to connect the piston head to a connecting rod 15, including a wrist pin (not shown). At the end portion of the connecting rod 15 opposite the piston head 25 is a crankshaft 16. The connecting rod 15 is configured to translate the linear motion of the piston assembly 20 into rotational motion upon the crankshaft 16. The connecting rod 15 has a head portion 32 that is typically disposed within the volume created by the piston skirt 26.

Figure 5A:
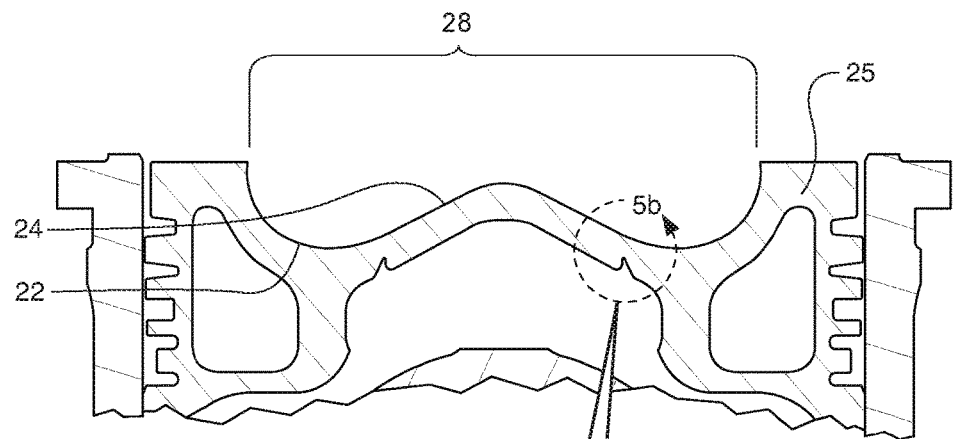
FIG. 5A is a detailed diagram of a portion of the piston of FIG. 3A.
Figure 5B:
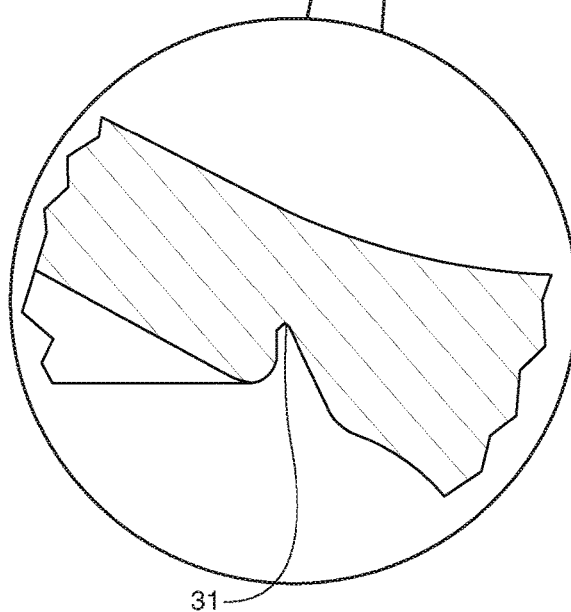
FIG. 5B is a close-up view of one embodiment of the structure required to induce favorable fracture on the piston of FIG. 5A.

As illustrated in FIGS. 1, 3A, 5A & 5B, the piston assembly 20 also comprises a failure initiation structure 31 provided to allow for favorable fracture to be initiated at a desired location on a bottom surface 42 of the bowl base 22 (in FIG. 4) at a predetermined load or pressure. In the illustrated embodiment, that failure initiation structure 31 is depicted as a groove in the bottom surface 42 such that when predetermined loads are reached within the combustion chamber 24, a favorable fracture develops along the failure initiation structure 31, causing a fragment 27 of the bowl base 22 to separate from the piston head. FIG. 5B shows a detailed view of one possible embodiment of the failure initiation structure 31. As illustrated in FIGS. 1, 2A, 3A, and 5A, the failure initiation structure 31 may be ring-shaped. The failure initiation structure 31 may also be situated circumferentially around the center of the combustion bowl 28 of the piston head 25. For pistons that have an elevated portion 23 of the combustion bowl 28, the failure initiation structure 31 may be located circumferentially around the elevated portion 23. In one embodiment shown in FIGS. 2B and 3B the failure initiation structure 31 is located such that the fragment 27 formed upon favorable fracture is of a size that allows the fragment 27 to be retained on the head portion 32 of the connecting rod 15.

The failure initiation structure 31 is depicted in this disclosure by the removal of material, possibly by machining, from the bottom surface 42 to form a groove. However, any method of inducing a favorable fracture at a specific location may be used. For example, as would be known to one of ordinary skill in the art, this could be done by forging the bottom surface 42 thickness so that it is smaller at a desired location. Alternatively, a metallurgical difference (weld) that would be susceptible to fracture at the preferred location at predetermined loads could be utilized. Likewise, in another embodiment, material may be removed from the bottom surface 42 in a discontinuous manner resulting in an interrupted groove. One of ordinary skill in the art will understand the design considerations and choices that would go into providing a structure that allows for favorable fracture at a specific location in the combustion bowl 28 at predetermined loads.

Figure 6:
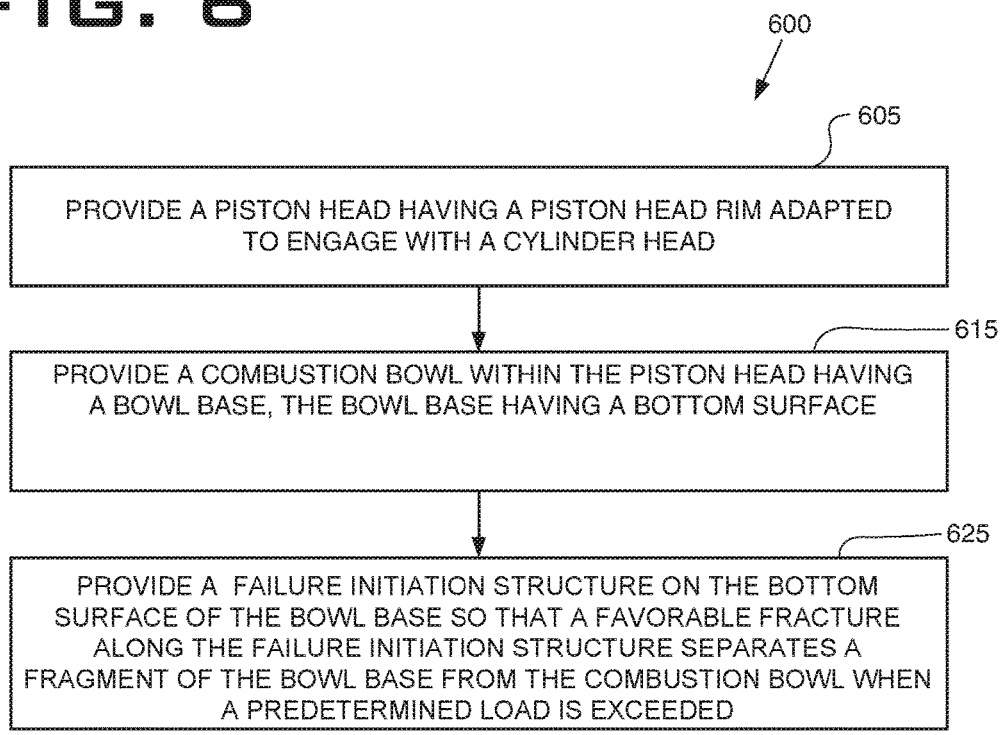
FIG. 6 is flow diagram of an exemplary method of making the piston assembly in FIGS. 2A and 2B.

Referring now to FIG. 6 a process flow diagram an exemplary method 600 for producing a piston assembly according to the present disclosure is illustrated. Method 600 may typically begin in block 605 in which a piston head having a piston head rim adapted to engage with a cylinder is provided using any one of several manufacturing techniques known in the art. Proceeding to block 615, a combustion bowl may be provided within the piston head using known manufacturing techniques forging or casting. The combustion bowl provided would have a bowl base that as a combustion surface that faces the cylinder head and a bottom surface facing the connecting rod. Proceeding then to block 625, a failure initiation structure is provided on the bottom surface of the bowl base that is configured so that a favorable fracture along the failure initiation structure separates a fragment of the bowl base from the combustion bowl when a predetermined pressure or load is exceeded within the combustion chamber. The failure initiation structure may be provided using any known and suitable machining, forging or other manufacturing techniques.

INDUSTRIAL APPLICABILITY

Internal combustion engines may from time to time have leakage of incompressible liquid such as water or coolant past the injector sleeve in the cylinder head into the combustion chamber. The presence of such incompressible liquid in the combustion chamber may create a situation of over pressure within an engine cylinder when the engine is started and a piston attempts to travel to top dead center position within the cylindrical bore. The excessive forces exerted by such over-pressure condition may be translated into the piston, connecting rod and the crankshaft that could damage one or more of the piston, the connecting rod and/or the crankshaft. Any such failure could cause further damage to the engine.

The disclosed internal combustion engine and piston assembly may be applicable to any internal combustion engine where a risk of incompressible liquid entering the combustion chamber exists. The operation of internal combustion engine 10 and piston assembly 20 is now explained. If an incompressible liquid were to be present in the combustion chamber as the engine 10 starts up and the piston head 25 travels up to top dead center within the cylinder bore 13, pressure would build up within the combustion chamber. As that pressure increases beyond a predetermined load, a favorable fracture should occur along the failure initiation structure 31, causing a fragment 27 to separate from the bowl base 22. The separation of the fragment 27 will release the excessive pressure in the combustion chamber and will allow the liquid to flow out of the combustion chamber, thereby preventing further damage to the engine beyond the piston.

It will be appreciated that the foregoing description provides examples of the disclosed system and methods. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

What is claimed is:

1. A piston for an internal combustion engine comprising: a piston head, having a piston head rim adapted to engage with a cylinder head; a combustion bowl having a bowl base, the bowl base having a combustion surface facing the cylinder head and forming at least a portion of a combustion chamber and a bottom surface facing a connecting rod; and a failure initiation structure in the bottom surface of the bowl base configured so that a fracture occurs along the failure initiation structure that separates a fragment of the bowl base from the combustion bowl when a predetermined load in the combustion bowl is exceeded allowing liquid in the combustion chamber to flow out of the combustion chamber to a lower pressure region in the piston, wherein the failure initiation structure is further configured such that the fragment is retained on a head portion of the connecting rod.

2. The piston of claim 1, wherein the failure initiation structure is an at least partially circumferential groove.

3. The piston of claim 1, wherein the failure initiation structure is an interrupted groove.

4. The piston of claim 1, wherein the failure initiation structure is ring-shaped.

5. The piston of claim 1, wherein the liquid flows at least partially within the head portion of the connecting rod to reduce damage to other components of the internal combustion engine.

6. The piston of claim 4, wherein the failure initiation structure is located circumferentially around an elevated portion in a center of the bowl base.

7. The piston of claim 1, wherein the failure initiation structure comprises a metallurgical difference or a weld between a radially inner portion of the bowl base and a radially outer portion of the bowl base relative to a longitudinal axis of the piston head.

8. An internal combustion engine comprising: a piston configured to be disposed within a cylinder bore, said piston having: a piston head having a longitudinal axis, the piston head having a piston head rim adapted to engage with a cylinder head, and a combustion bowl having a bowl base, wherein the bowl base includes a combustion surface facing the cylinder head and a bottom surface facing a connecting rod, wherein the combustion bowl includes an outer circumference; and a failure initiation structure in the bottom surface of the bowl base configured so that a fracture occurs along the failure initiation structure that separates a fragment of the bowl base from the combustion bowl when a predetermined load in the combustion bowl is exceeded, and so that the fragment is retained on a head portion of the connecting rod, and wherein an entirety of the failure initiation structure is located radially within the outer circumference of the combustion bowl relative to the longitudinal axis of the piston head.

9. The internal combustion engine of claim 8, wherein the failure initiation structure is an at least partially circumferential groove.

10. The internal combustion engine of claim 8, wherein the failure initiation structure is an interrupted groove.

11. The internal combustion engine of claim 8, wherein the failure initiation structure is ring-shaped.

12. The internal combustion engine of claim 11, wherein the failure initiation structure is located circumferentially around an elevated portion in a center of the bowl base.

13. The internal combustion engine of claim 8, wherein the fracture allows liquid in a combustion chamber at least partially formed by the combustion bowl to flow out of the combustion chamber to a lower pressure region in the piston.

14. The internal combustion engine of claim 13, wherein the liquid flows at least partially within the head portion of the connecting rod to reduce damage to other components of the internal combustion engine.

15. A method of producing a piston for an internal combustion engine comprising: providing a piston head having a piston head rim adapted to engage with a cylinder head, providing a combustion bowl within the piston head having a bowl base, the bowl base having a bottom surface and an elevated portion in a center portion of the bowl base, and providing a failure initiation structure in the bottom surface of the bowl base at least partially surrounding the elevated portion and configured so that a fracture along the failure initiation structure separates a fragment of the bowl base from the combustion bowl when a predetermined load in the combustion bowl is exceeded, and so that the fragment is retained on a head portion of the connecting rod.

16. The method of claim 15, wherein providing the failure initiation structure comprises machining a circular groove in the bottom surface of the bowl base of the piston.

17. The method of claim 15, wherein providing the failure initiation structure comprises forging a circular groove in the bottom surface of the bowl base during formation of the piston.

18. The method of claim 15, wherein providing the failure initiation structure comprises forming a metallurgical difference or a weld between a radially inner portion of the bowl base and a radially outer portion of the bowl base relative to a longitudinal axis of the piston head.

19. The method of claim 15, wherein when the predetermined load in the combustion chamber is exceeded, the fragment allows liquid in a combustion chamber to flow out of the combustion chamber to a lower pressure region in the piston.

\* \* \* \* \*